(12) United States Patent
Nonaka et al.

(10) Patent No.: US 6,850,702 B2
(45) Date of Patent: Feb. 1, 2005

(54) CAMERA AND LIGHT-RECEIVING SENSOR OF THE CAMERA

(75) Inventors: Osamu Nonaka, Sagamihara (JP); Koichi Nakata, Kokubunji (JP); Yoshiaki Kobayashi, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/678,519

(22) Filed: Oct. 2, 2003

(65) Prior Publication Data

US 2004/0071457 A1 Apr. 15, 2004

(30) Foreign Application Priority Data

Oct. 4, 2002 (JP) ........................................ 2002-292563

(51) Int. Cl.$^7$ ............................ G03B 7/28; G03B 13/36
(52) U.S. Cl. ........................ 396/100; 396/165; 396/234
(58) Field of Search .......................... 396/96, 100, 165, 396/233, 234

(56) References Cited

U.S. PATENT DOCUMENTS 4,791,446 A * 12/1988 Ishida et al. .................. 396/96
5,151,732 A * 9/1992 Akashi et al. ................. 396/96

FOREIGN PATENT DOCUMENTS

JP          7-281083 A      10/1995
JP       2001-13566 A       1/2001

* cited by examiner

*Primary Examiner*—W. B. Perkey
(74) *Attorney, Agent, or Firm*—Frishauf, Holtz, Goodman & Chick, P.C.

(57) ABSTRACT

In a pair of photometric sensors which receive an object light flux through a pair of the light-receiving lenses are formed on a semiconductor chip on which a pair of the sensor arrays are formed. Further, one of a pair of the photometric sensor performs photometry at an upper part of the footage, and the other photometric sensor carries out photometry at a lower part of the footage.

4 Claims, 9 Drawing Sheets

CAMERA AND LIGHT-RECEIVING SENSOR OF THE CAMERA

CROSS-REFERENCE TO RELATED APPLICATIONS

This application is based upon and claims the benefit of priority from the prior Japanese Patent Application No. 2002-292563, filed Oct. 4, 2002, the entire contents of which are incorporated herein by reference.

BACKGROUND OF THE INVENTION

1. Field of the Invention

The present invention relates to a camera and a light-receiving sensor of a camera, and more particularly to a miniaturization of a camera in which a distance measuring device and a photometric device for exposure are rationally combined.

2. Description of the Related Art

In recent years, with a realization of a personal use, further distinctive designs or smart and small portability tend to be demanded in cameras.

In travels in particular, many users take along a compact camera in order to capture memories while traveling, and take snap pictures in various scenes by this camera. Many functions must be miniaturized in order to cope with such a use.

As a realization of the miniaturization of many functions for such a compact camera, there is a technique to include some sensors in a camera in a compact manner. By this technique, many individual sensors are put together in a narrow space in accordance with an actual status of a layout of the camera. (e.g., see Jpn. Pat. Appln. KOKAI Publication No. 2001-13566.)

Further, there is known a technique by which a monitor sensor is also provided on a chip of a focusing sensor of a single lens reflex camera. This technique is applied to a distance measuring and photometric device which is inexpensive and enable the miniaturization by a distance measuring a photometric sensor on a symmetrical line of a pair of distance measuring sensors so as to be orthogonal to the distance measuring sensors (e.g., see Jpn. Pat. Appln. KOKAI Publication No. 7-281083). As a result, a camera having this device mounted therein is reduced in size.

BRIEF SUMMARY OF THE INVENTION

It is, therefore, an object of the present invention to provide a camera and a light-receiving sensor of a camera which realize a further miniaturization, contribute to design properties, and achieve a reduction in cost in a compact type camera.

According to first feature of the present invention, there is provided a camera comprising:
- a light-receiving lens;
- a pair of distance measuring sensor arrays which receive an object light flux through the light-receiving lens and are formed on a semiconductor;
- a focus adjustment mechanism which adjusts a focus state of a taking lens based on outputs from the distance measuring sensor arrays; and
- a pair of photometric sensors which are arranged on the semiconductor chip and respectively arranged so as to be adjacent to a pair of the distance measuring sensor arrays.

According to second feature of the present invention, there is provided a light-receiving sensor of a camera which is packaged including a single semiconductor chip, on the semiconductor chips being formed:
- first and second distance measuring sensor arrays;
- a first photometric sensor which is arranged at a position adjacent to the first distance measuring sensor array;
- a second photometric sensor which is arranged at a position adjacent to the second distance measuring sensor array; and
- a processing circuit for the respective sensors.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment according to the present invention will now be described hereinafter with reference to the accompanying drawings.

First, referring to FIGS. 1A and 1B, a structure of a sensor unit according to an embodiment of the present invention will be described.

Figure 1A:
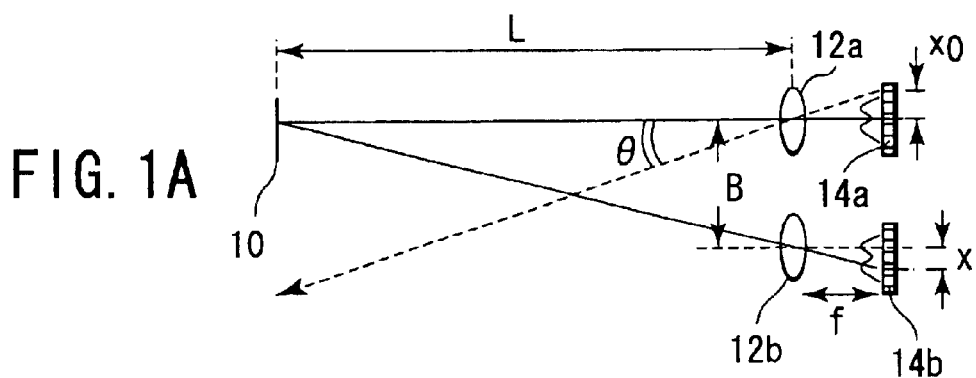
FIGS. 1A and 1B are views illustrating a structure of a sensor unit in an embodiment according to the present invention.

In FIG. 1A, a pair of light-receiving lenses 12a and 12b are arranged at positions away from an object 10 by a distance L. These light-receiving lenses 12a and 12b have a parallax of a base line length B between main points. Therefore, although an image of the object 10 existing at the position away from the object 10 by the distance L is led by the respective lenses 12a and 12b and enters sensor arrays 14a and 14b, a positional difference indicated by x in the drawing is generated at a relative position of the image. The object distance L can be obtained based on this positional difference x, a distance f between the light-receiving lenses and the sensors and B by the following expression.

$$L = B \cdot f / x$$

Therefore, obtaining the positional difference x by comparing output image data of the two sensor arrays 14a and 14b can acquire a focusing position according to the distance L. An auto focus (AF) technique determines a position of a focusing lens based on this result and performs shooting.

If the sensor array 14a can obtain an image signal from a lens optical axis to a position of $x_0$, distance measuring to an angle $\theta = \arctan(x_0/f)$ shown in the drawing is enabled. When distance measuring of each point is carried out varying θ in this manner, a so-called multi-AF function can be obtained.

Figure 1B:
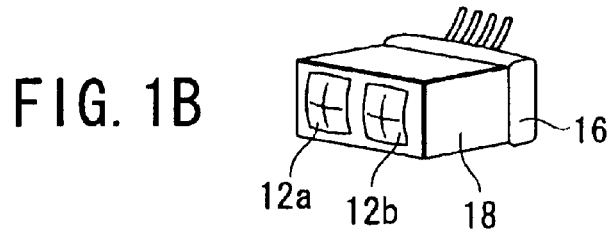

Such a distance measuring sensor has an appearance shown in FIG. 1B. That is, the distance measuring sensor is constituted by a clear mold IC package 16 including a pair of the light-receiving lenses 12a and 12b and the sensor arrays 14a and 14b (not shown), and a frame 18 fixing and holding their relationship.

Figure 2:
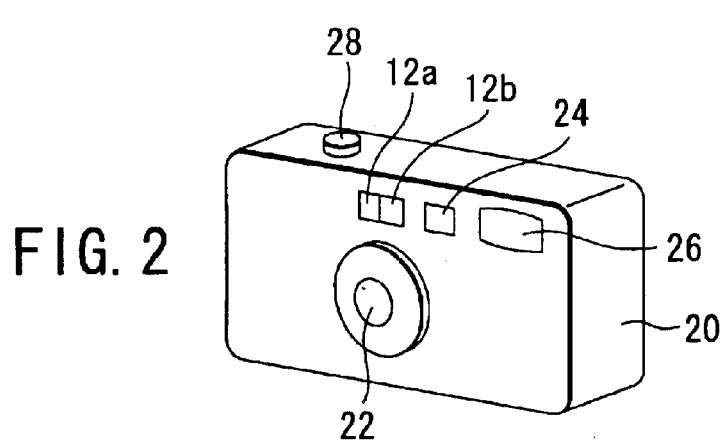
FIG. 2 is a outline perspective view of a compact camera having the sensor unit of FIG. 1 mounted therein.

FIG. 2 is an outline perspective view of a compact camera having such a sensor unit mounted therein.

A taking lens 22 is arranged at a substantially central part of a front face portion of a camera main body 20. Further, light-receiving lenses 12a and 12b of a sensor unit in which the above-described sensor unit is laid out, a finder object lens 24 and a flash light emission section 26 are sequentially arranged above the taking lens 22.

Furthermore, a release button 28 is arranged at an upper part of the camera main body 20.

Figure 1C:
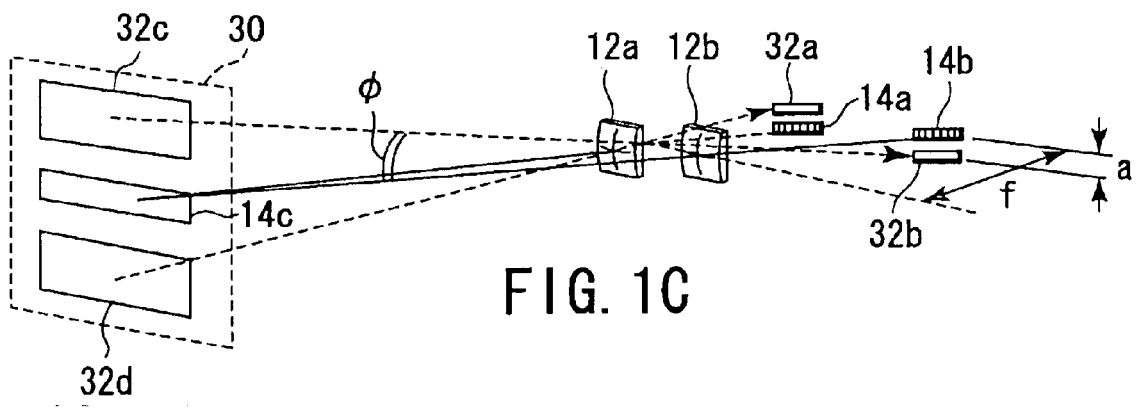
FIG. 1C is a view further stereoscopically showing an arrangement of a photometric (AE) sensor which is characteristics of the present invention.

FIG. 1C is a view further stereoscopically showing an arrangement of photometric (AE) sensors 32a and 32b which are the characteristics of the present invention.

In FIG. 1C, the light-receiving lens 12a has an effect to lead the light to the distance measuring sensor array 14a as well as the AE sensor 32a. On the other hand, the light-receiving lens 12b has an effect to lead the light to the distance measuring sensor array 14b as well as the AE sensor 32b.

As shown in FIG. 1A, since the distance measuring sensor 14a and 14b obtain the distance by using two image signals received through the two light-receiving lenses having a parallax, a distance measuring monitor area 14c which function as the same part must be monitored by the two sensors. However, when the AE sensors 32a and 32b monitor points of different areas 32c and 32d rather than the same part, a further large area can be ranged, which is preferable.

Therefore, the AE sensor 32a is arranged above the sensor array 14a, and the AE sensor 32b is arranged below the sensor array 14b. Moreover, the photometry of the parts of the areas 32c and 32d in the upper and lower directions of the distance measuring monitor area 14c is enabled in the sharing manner by the thus arranged AE sensors 32a and 32b.

When the photometry of the areas 32c and 32d and the area 14c are carried out altogether in this manner, the photometry of a large area in a picture plane can be performed, thereby enabling shooting with a correct exposure.

Figure 3A:
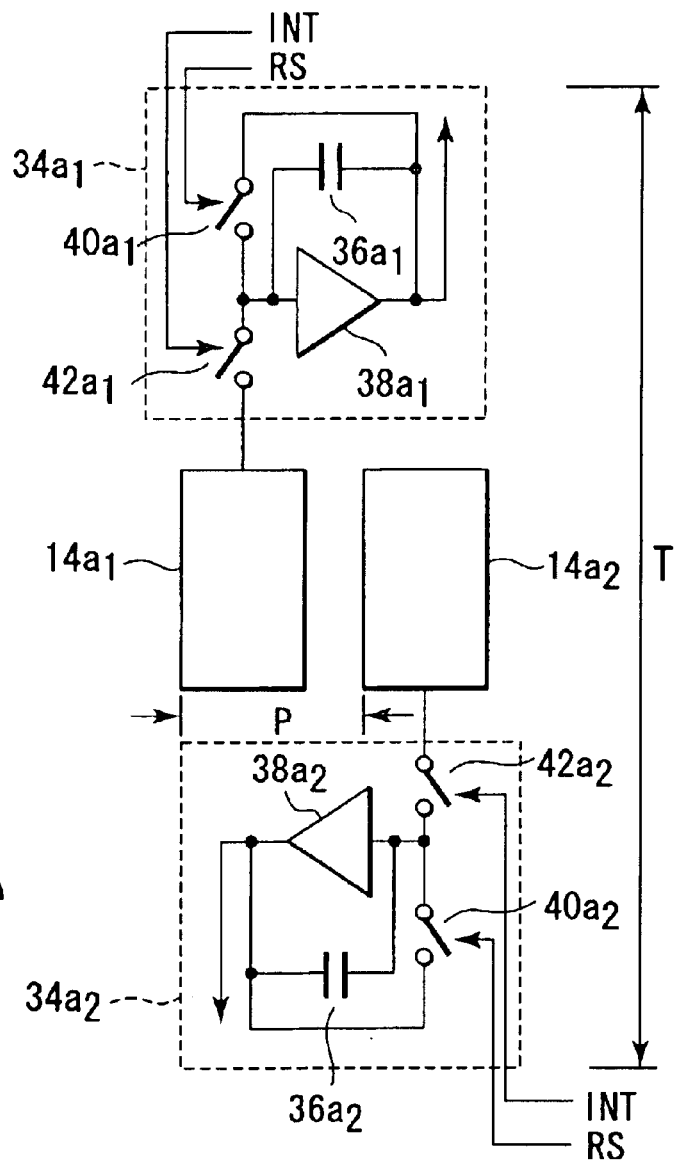
FIG. 3A is a view showing an arrangement example of a general photometric sensor array and processing circuit sections.

In general, as shown in FIG. 3A, to the photometric sensor array are provided processing circuit sections $34a_1, 34a_2, \ldots$ in the upper and lower directions of light receiving planes $14a_1, 14a_2, \ldots$ constituting the photometric sensor array. The processing circuit sections $34a_1, 34a_2, \ldots$ integrate photoelectric currents outputted from photodiodes of the respective light receiving planes to integration capacitors $36a_1, 36a_2, \ldots$. Additionally, the processing circuit sections $34a_1, 34a_2, \ldots$ are constituted by the integration capacitors $36a_1, 36a_2, \ldots$, integration amplifiers $38a_1, 38a_2, \ldots$, switches $38a_1, 38a_2, \ldots$, switches $40a_1, 40a_2, \ldots$, and others.

The switches $38a_1, 38a_2, \ldots$ are switches to reset the integration capacitors $36a_1, 36a_2, \ldots$. Further, the switches $40a_1, 40a_2, \ldots$ are switches to start and terminate the integration.

Figure 3B:
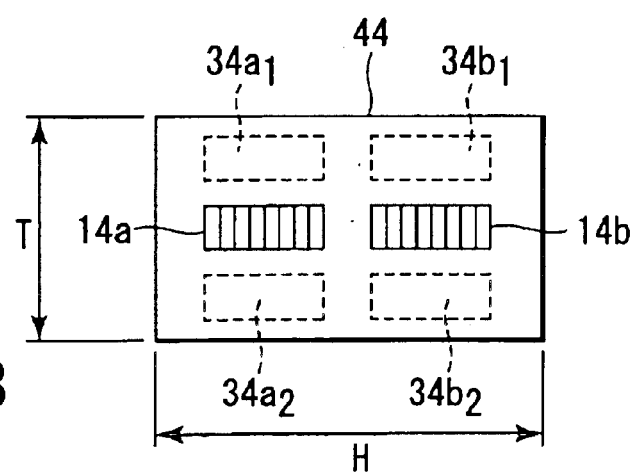
FIG. 3B is a view showing an example of a layout of the photometric sensor array and the processing circuit sections of FIG. 3A on a semiconductor chip.

These integration capacitors $36a_1, 36a_2, \ldots$, the integration amplifiers $38a_1, 38a_2, \ldots$, the switches $40a_1, 40a_2, \ldots$, the switches $42a_1, 42a_2, \ldots$ are all formed on the same semiconductor chip. Furthermore, as shown in FIG. 3B, the processing circuit sections $34a_1, 34a_2$ are aligned and provided in the upper and lower directions of the respective sensor arrays 14a and 14b. Dimensions of the circuits or the light receiving planes of the processing circuit sections $34a_1$ and $34a_2$ determine the dimension TXH of a sensor chip 44.

The sensitivity is deteriorated when the light receiving plane is reduced in size, and the accuracy is degraded when the pitch is rough. Therefore, as shown in FIG. 3A, the layout arrangement is distributed in the upper and lower directions. That is, one circuit is provided every two sensors without jamming the circuits into a narrow pitch P. As a result, the sensor arrays 14a and 14b are arranged at the central part of the chip in the upper and lower directions, and hence their positions are correctly set on the optical axes of the light-receiving lenses 12a and 12b when enclosed in a package 16.

Figure 4A:
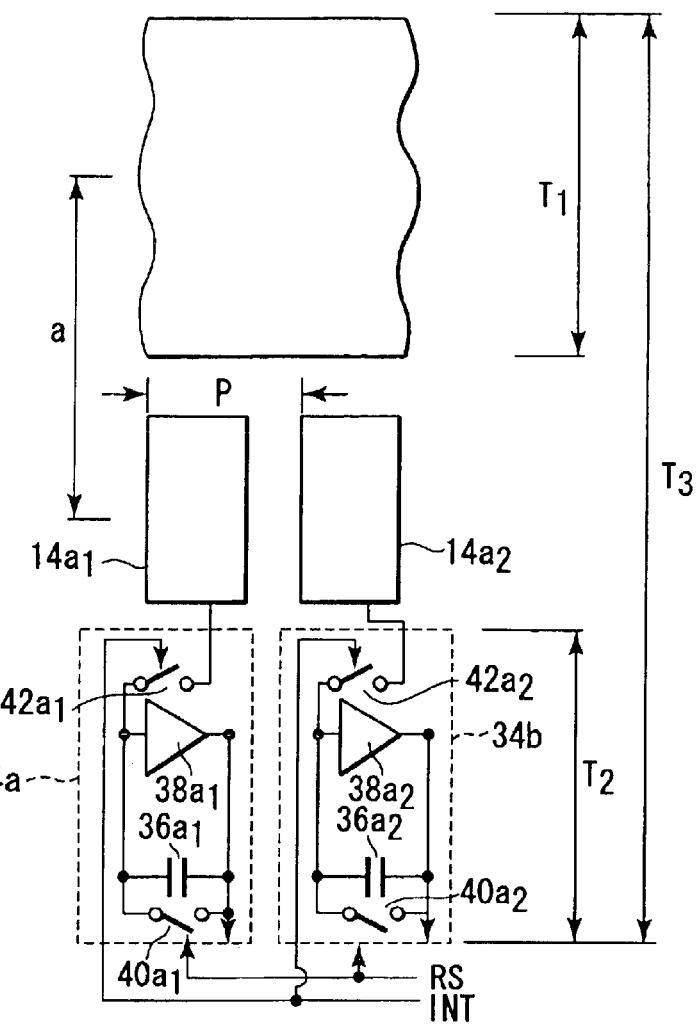
FIG. 4A is a view showing an arrangement example of the photometric sensor array and the processing circuit sections according to the embodiment of the present invention.

The present invention must provide the AF sensors 32a and 32b while accommodating such processing circuits in the chip. Therefore, as shown in FIG. 1C, the AE sensors are distributed in such a manner that one sensor partially monitors, and the whole can be monitored only when the two light-receiving lenses are used. As shown in FIG. 4A, therefore, the light receiving plane for AE is arranged in the upper (or lower) direction of the sensor arrays $3a_1, 3a_2, \ldots$, and the processing circuit sections $34a_1$ and $34a_2$ are arranged in the lower (or upper) direction of the sensor arrays $14a_1, 14a_2, \ldots$.

Figure 4B:
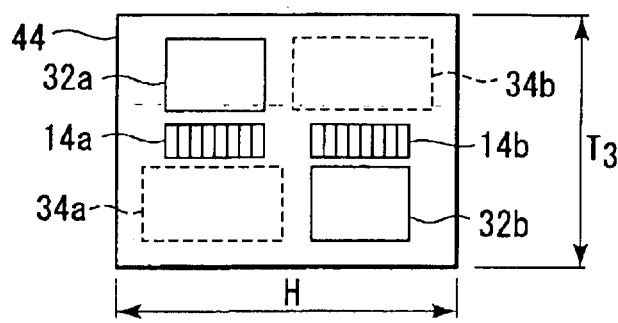
FIG. 4B is a view showing an example of a layout of the photometric sensor array and the processing circuit sections of FIG. 4A on the semiconductor chip.

As a result, the upper and lower directions of the chip are balanced by the AE light receiving plane and the processing circuit sections. That is, as shown in FIG. 4B, the AF sensor arrays 14a and 14b are arranged at the central part in the chip 44 in the upper and lower directions.

In the processing circuit sections $34a_1$, $34a_2$, ... shown in FIG. 3A, the switches $40a_1$, $40a_2$, ... or the switches $42a_1$, $42a_2$, ... are arranged in the alignment direction of the light receiving planes of the sensor arrays $14a_1$, $14a_2$, .... However, according to an example depicted in FIG. 4A, in order to provide the processing circuit sections in the narrow pitch as many as possible, the switches $40a_1$, $40a_2$, ... or the switches $42a_1$, $42a_2$, ... are arranged in the vertical direction like the integration amplifiers $38a_1$, $38a_2$, ... or the integration capacitors $36a_1$, $36a_2$, ....

Although the processing circuit sections becomes longer in the vertical direction than that shown in the layout depicted in FIG. 3A and has a height $T_2$, this can suppress an increase by refining of the process or simplification of the circuits. When the AE sensors are provided with a height $T_1$ which is substantially equal to $T_2$, the AF sensor arrays are arranged at the central part of the chip, and the AE sensors which monitor the upper and lower directions of a picture plane by each lens of the light-receiving lenses can be naturally accommodated in the chip (see FIG. 4B).

Further, when the circuits are simplified, both the AF and AE sensors can be laid out in substantially the same area.

Assuming that a is a distance between the AE sensor central part and the AF sensor array central part (see FIGS. 4A and 1C), the upper or the lower part of $\phi$=arc tan (a/f) can be monitored with respect to the center of a picture plane.

Figure 4C:
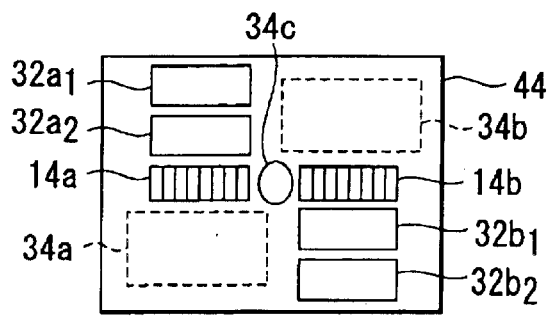
FIG. 4C is a view showing another example of the layout of the photometric sensor array and the processing circuit section of FIG. 4A on the semiconductor chip.
Figure 5:
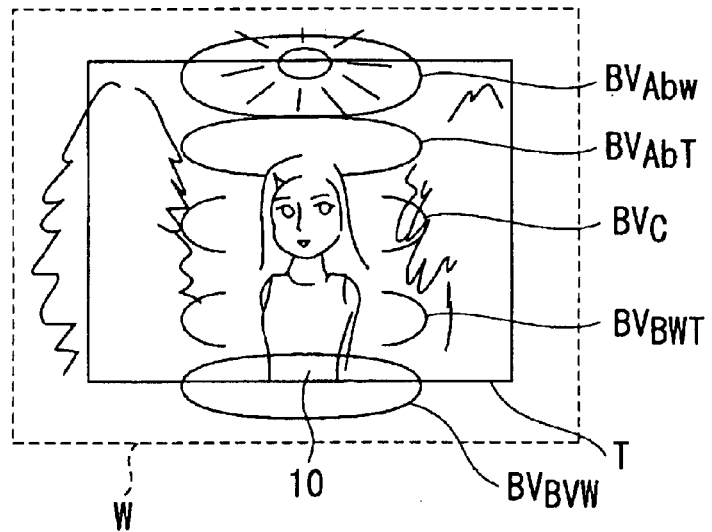
FIG. 5 is a view showing an example of brightness of each portion obtained by an AF sensor with respect to a picture plane.

Furthermore, as shown in FIG. 4C, the respective AE sections 32a and 32b are divided into two in the upper and lower directions ($32a_1$, $32a_2$ and $32b_1$, $32b_2$) in order to enable a judgment upon the brightness from a light quantity which has entered each area. Then, as shown in FIG. 5, the brightness $BV_C$ at the central part, the brightness $BV_{AbT}$ immediately above the central part, the brightness $BV_{AbW}$ at the further upper part, the brightness $BV_{BWT}$ at the lower part, and the brightness at the further lower part $BVB_{WW}$ can be obtained by the AF sensor.

That is, when the camera is set on the tele side, the picture plane is as indicated by 30T. Therefore, when photometry is carried out by using $BV_C$, $BV_{AbT}$ and $BV_{BWT}$, the brightness in the picture plane can be correctly obtained without being affected by the sun.

Moreover, when a zoom position of the camera is a wide position, $BV_{AbW}$ and $BVB_{BWW}$ at the further upper and lower parts can be used to enable a judgment upon the brightness suitable for a wide screen 30W.

Figure 6:
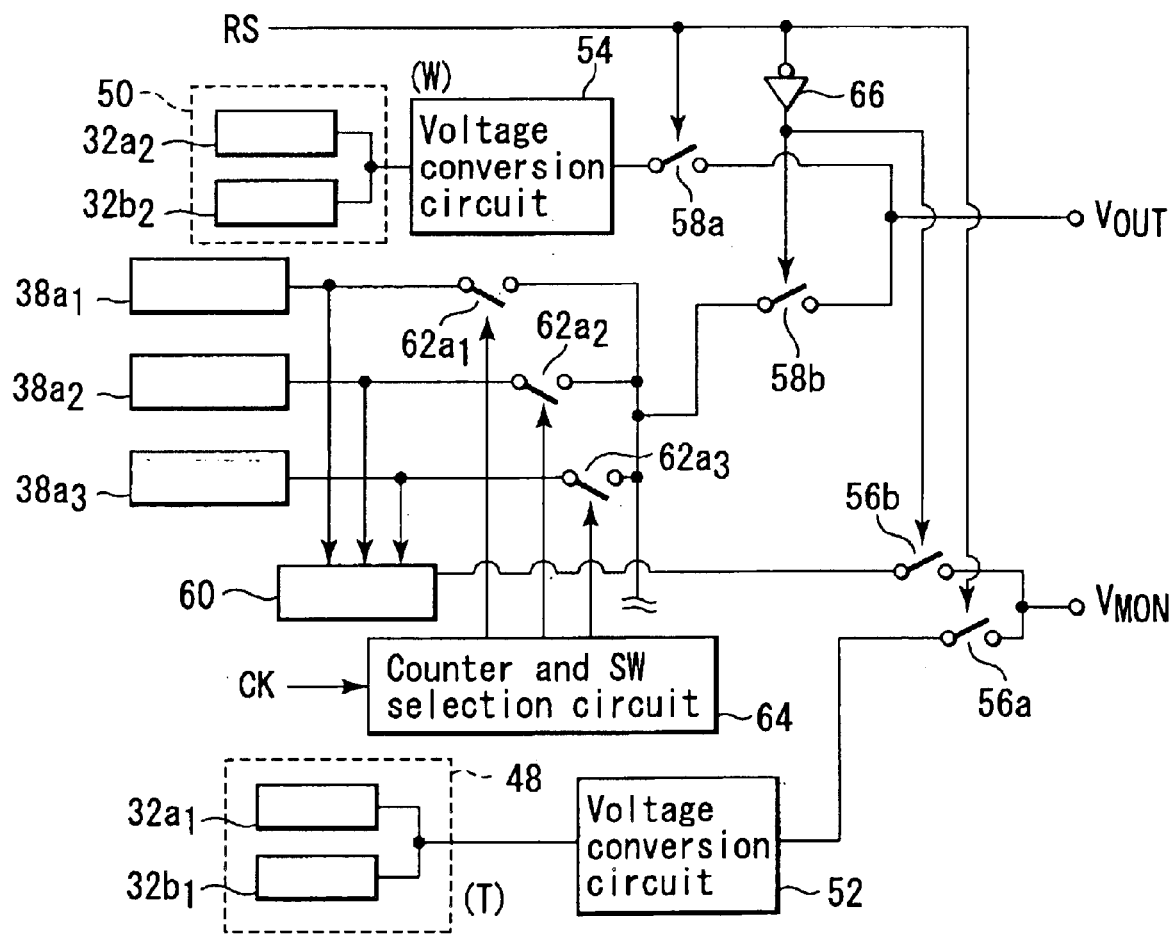
FIG. 6 is a view showing a structural example of the processing circuit section.

When switching areas in accordance with zooming in this manner, a brightness sensor may be constituted by integrating the AE sections $32a_1$ and $32b_1$ shown in FIG. 4C as tele sensors and the AE sections $32a_2$ and $32b_2$ as wide sensors. When exercising such an ingenuity, the processing circuit sections may have such a structure as shown in FIG. 6.

That is, a sensor 48 is constituted by the tele sensors $32a_1$ and $32b_1$, and a sensor 50 is constituted by the wide sensors $32a_2$ and $32b_2$. Further, outputs from the sensors 48 and 50 are supplied to switches 56a and 58a through respective voltage conversion circuits 52 and 54.

Furthermore, outputs from the integration circuits (processing circuits) $38a_1$, $38a_2$, $38a_3$, ... of each sensor in the sensor array are supplied to a maximum value judgment circuit (MAX) 60 as well as switches $62_1$, $62_2$, $62_3$, .... These switches $62_1$, $62_2$, $62_3$, ... are turned on/off by the control of a counter and a switch (SW) selection circuit 64. An output from the maximum value judgment circuit 60 is supplied to a switch $56_b$.

On the other hand, outputs from the switches $62_1$, $62_2$, $62_3$, ... are supplied to a switch 58b.

The switches 56a and 58a are controlled by an RS (reset) signal, and the switches 56b and 58b are controlled by an inverted signal of the RS signal through an inversion element 66.

That is, output from the tele sensor 48 and the wide sensor 50 are led to the switches 56a and 58a through the respective voltage conversion circuits 52 and 54. Moreover, when the switch 56a or 58a is turned on, voltage outputs can be taken to the outside of the IC as $V_{MON}$ and $V_{OUT}$.

The AF sensor requires the two outputs $V_{MON}$ and $V_{OUT}$ in the first place. By turning off the switches 56a and 58a and turning on the switches 56b and 58b in the AF mode, these outputs can function as an integration monitor output and a sensor data output, respectively. That is, in order to correctly obtain an image signal for AF, the integration voltage must be optimized, and the monitor output $V_{MON}$ is required to control this.

This can be controlled by detecting and selecting a largest output from outputs of the integration circuits (processing circuit sections) $38a_1$, $38a_2$, $38a_3$, ... of each sensor in the sensor array and supplying an output selected for a $V_{MON}$ terminal, and turning off the switches $42a_1$, $42a_2$, ... shown in FIGS. 3A and 4A in order to stop integration when this level is changed to an appropriate level.

Additionally, when a clock (CK) is inputted to the counter and the switch (SW) selection circuit 64 from the outside, the switches $62a_1$, $62a_2$, $62a_3$, ... are sequentially turned on in this circuit, and integration results of the respective integration circuits $38a_1$, $38a_2$, $38a_3$, ... can be outputted to the outside as $V_{OUT}$ through the switch 58b. Such a digital circuit section is arranged at, e.g., a part indicated by reference numeral 34c in FIG. 4C.

Figure 7:
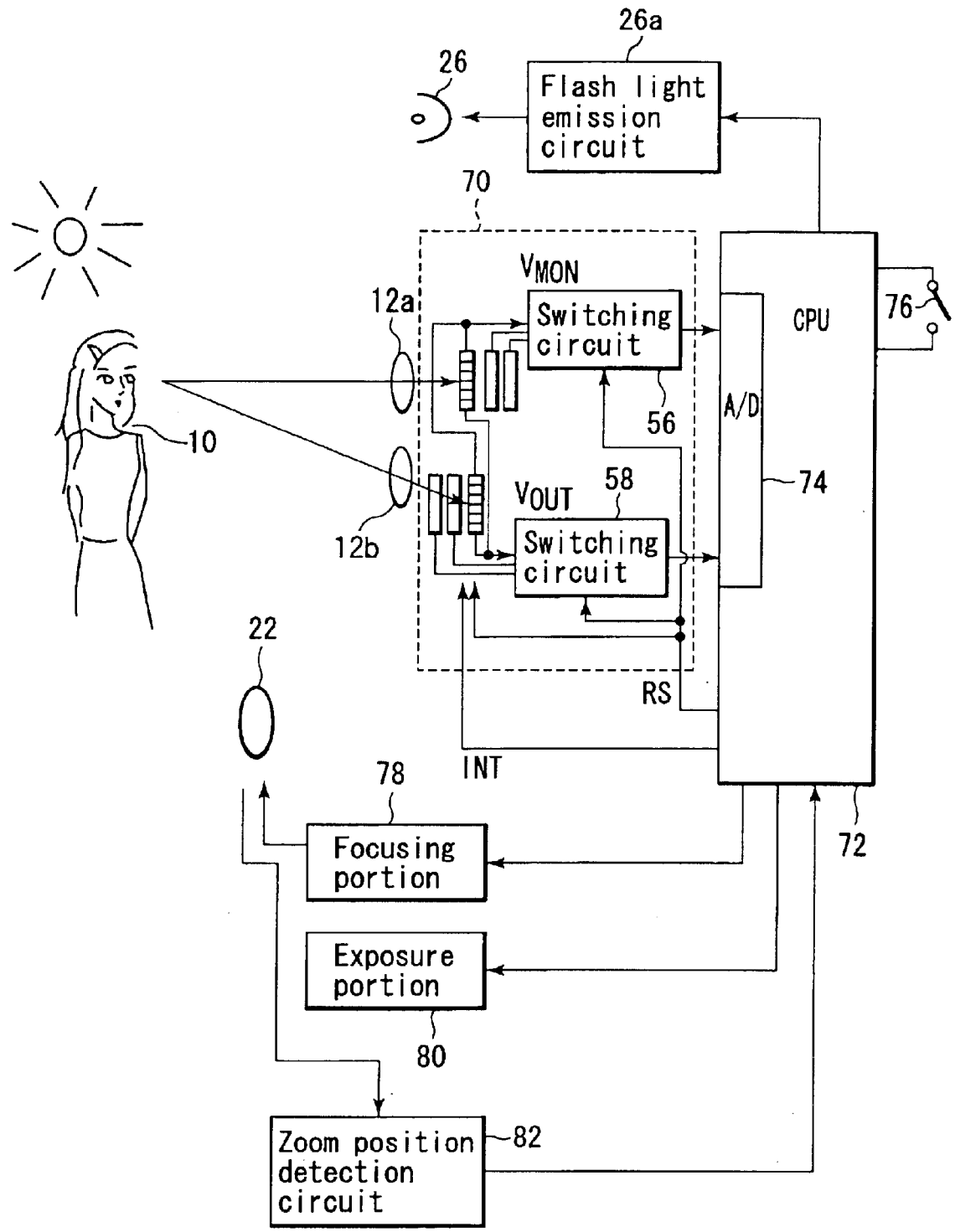
FIG. 7 is a block diagram showing an AF and AE camera having mounted therein a distance measuring unit having a switching circuit, the processing circuit section and the sensor of FIG. 6.

FIG. 7 is a block diagram showing a structure of an AF and AE camera having mounted therein a distance measuring unit having an IC 70 with the switching circuits, the processing circuit sections and the sensors.

In FIG. 7, a CPU 72 is arithmetic operation controlling means constituted by a microcomputer used to perform a concentrated control over a control of the camera. A built-in A/D conversion circuit 74 is provided in the CPU 72, and outputs ($V_{OUT}$ and $V_{MON}$ in FIG. 6) from the respective switching circuits 56 and 58 are converted into digital values by this switching circuit 56.

Further, in the CPU 72, an operation of a release switch 76 (corresponding to the release button 28) by a camera operator (not shown) is detected, each circuit is judged by using a control output signal, and a focusing portion 78, an exposure portion 80 consisting of a shutter and others, a flash light emission circuit 26a are controlled so as to enable a correct shooting.

In the CPU 72, the light emission of the flash light emission section 26 is controlled through the flash light emission circuit 26a. Furthermore, a taking lens 22 is controlled by the CPU 72 through the focusing section 78. When the zooming is carried out, the CPU 72 detects a position of the taking lens 22 by using a zoom position detection circuit 82, and appropriately selects, e.g., an AE sensor output.

Moreover, the digital circuit section shown in FIG. 6 is depicted as switching circuits 56 and 58 in the IC 70 in FIG. 7. It is to be noted that FIG. 7 shows only the light receiving planes of the sensor array, the AE sensor the processing circuit sections since the illustration becomes complicated. Light-receiving lenses 12a and 12b are arranged in front of the sensor array, and the image or the brightness of a person as an object 10 can be thereby detected.

Figure 8:
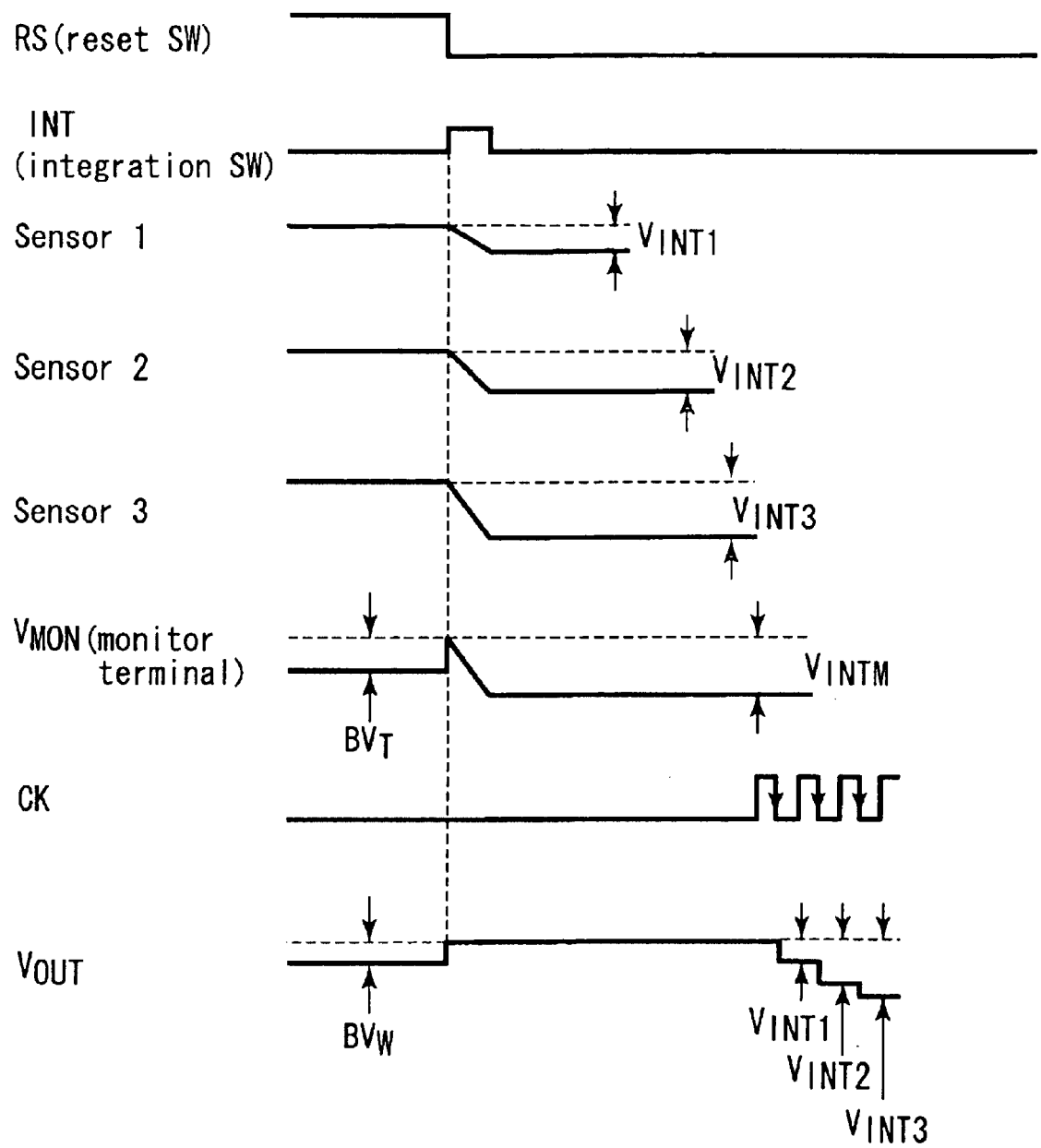
FIG. 8 is a timing chart illustrating an operation of each section of the camera according to the embodiment of the present invention.

An operation of each above-described section in the camera having such a structure will now be described with reference to a timing chart shown in FIG. 8.

When the CPU 72 outputs signals such as RS (reset), INT (integration SW), CK (clock) and others, the AF integration is driven by the RS signal. Here, in the reset state, respective AE output signals are also outputted from a $V_{MON}$ terminal and a $V_{OUT}$ terminal. As a result, an average value $BV_T$ of $BV_{AbT}$ and $BV_{BWT}$ shown in FIG. 5 and an average value $BV_W$ of $BV_{AbW}$ and $BV_{BWW}$ are obtained, and they are detected by the CPU 72.

Since integration is possible when the RS terminal is changed to L (low level), the integration SW is turned on, and integration begins. Then, integration starts in each sensor, and an output obtained by outputting a largest integration value is outputted to $V_{MON}$ as $V_{INTM}$. Therefore, in the CPU 72, when this output is changed to an appropriate level, the integration SW is turned off (L). Then, when CK is inputted, outputs from the respective sensors in the AF sensor array are outputted from $V_{OUT}$ as $V_{INT1}$, $V_{INT2}$, . . .

When $V_{INT1}$, $V_{INT2}$, . . . are sequentially subjected to A/D conversion, a distribution of the light inputted to each sensor can be realized, thereby obtaining an AF image output.

Figure 9:
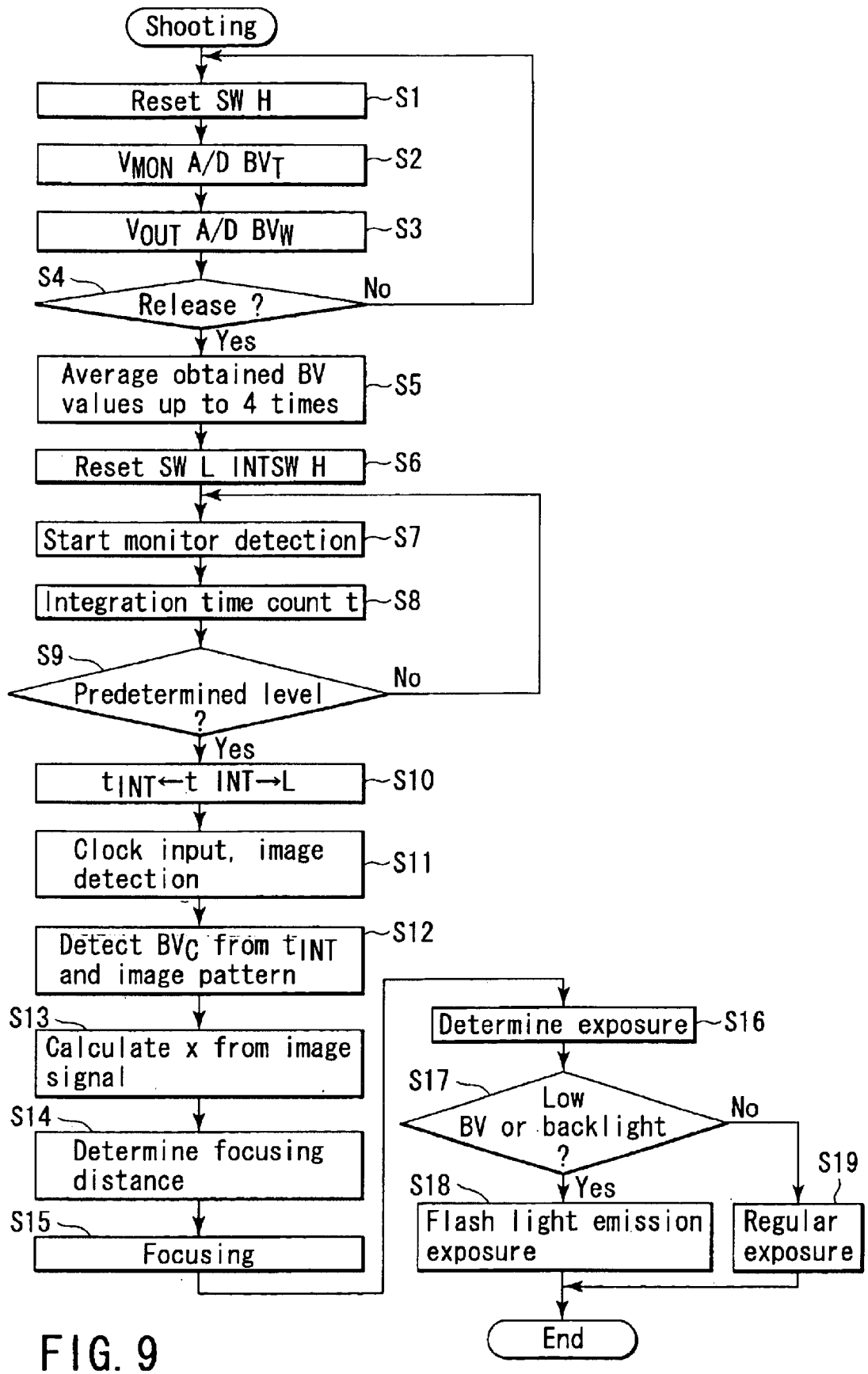
FIG. 9 is a flowchart illustrating an operation of the camera according to the embodiment of the present invention.

FIG. 9 is a flowchart illustrating an operation when the CPU 72 executes such a control.

A shooting operation of the camera in this embodiment will now be described hereinafter with reference to this flowchart.

Before the release switch 76 corresponding to the release button 28 is inputted, the AE sensor output is monitored at steps S1 to S3. That is, the reset switch is changed to H (high level) at the step S1, and $BV_T$ and $BV_W$ are obtained from the $V_{MON}$ terminal and the $V_{OUT}$ terminal, respectively at the subsequent steps S2 and S3.

Then, at a step S4, a state of the release switch 76 is judged. Here, the processing proceeds to the step S1 when the release switch is OFF, and the processing advances to a step S5 when the same is ON.

At the step S5, $BV_T$ and $BV_W$ obtained at the steps S2 and S3 are averaged, thereby acquiring $VB_T$ and $BV_W$. This is a countermeasure for the flicker of a fluorescent lamp or the like. A light source which fluctuates in such a commercial frequency can perform correct photometry by averaging several photometric results obtained with different timings.

After the release switch 76 is operated, a flow of a distance measuring operation begins.

First, at a step S6, the integration reset switch is turned off (L), and the integration switch is simultaneously turned on, thereby starting integration. Then, monitor detection is carried out at a step S7, and an integration time is counted at a step S8. Furthermore, at a step S9, integration continues until integration on a predetermined level is carried out.

At a step S10, an integration time t counted at the step S8 is determined as $t_{INT}$. At this time, integration is terminated with INT being determined as L.

Thereafter, at a step S1, a clock is inputted to CK, the respective sensor data which are sequentially read are subjected to A/D conversion, and detection is carried out.

Figure 10:
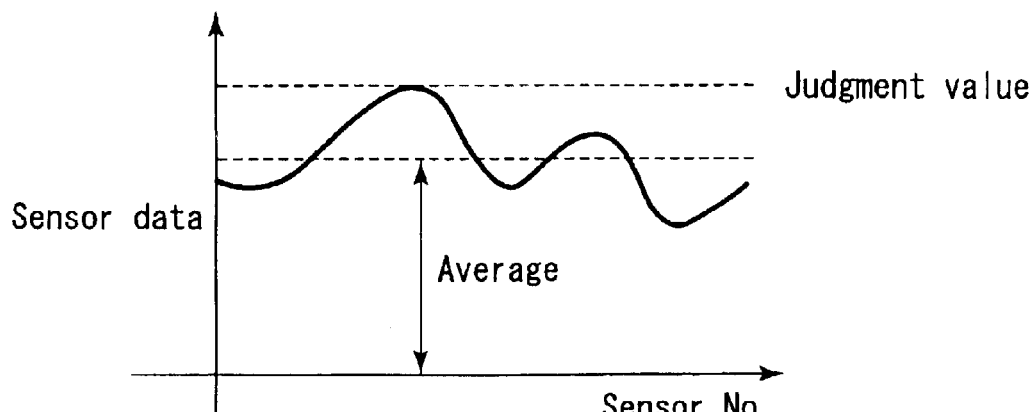
FIG. 10 is a characteristic view of sensor data.

At a subsequent step S12, a photometric value $BV_C$ of an AF sensor area (14c shown in FIG. 1C) is obtained based on an image pattern and $t_{INT}$. As to this operation, an average value of the photometric values is obtained by using sensor data shown in FIG. 10, and the average brightness of the distance measuring monitor area 14c in FIG. 1B is calculated by using a ratio with a judgment value and the integration time $t_{INT}$. Here, assuming that the judgment value is fixed, it can be determined that the brightness is low as $t_{INT}$ is long and the brightness is high as the same is short. When this average value is lower than the judgment value, it can be thereby determined that the brightness is low.

Since a pair of image signals can be obtained by a pair of the sensor arrays in this manner, a deviation of these signals due to a parallax is detected at a step S13, and this is determined as x. An object distance is determined at a subsequently step S14 based on x obtained at the step S13, and focusing is carried out at a step S15.

Then, at a step S16, controls over exposure determination, flash light emission and others at a step S18 or subsequent steps are carried out by using the thus obtained photometric values at the central, upper and lower parts (areas 32c, 14c and 32d shown in FIG. 1C) in the picture plane.

In case of the low brightness of backlight, the flash light emission exposure and the usual exposure are switched. Therefore, at a step S17, a judgment is made upon whether the low brightness or backlight is provided with respect to an exposure value determined at the step S16. In case of the low brightness or backlight as a result of the judgment, the processing advances to a step S18, and shooting using the flash light emission is carried out. On the other hand, if the low brightness or backlight is not provided, the processing advances to a step S19, and usual shooting is effected.

Figure 11:
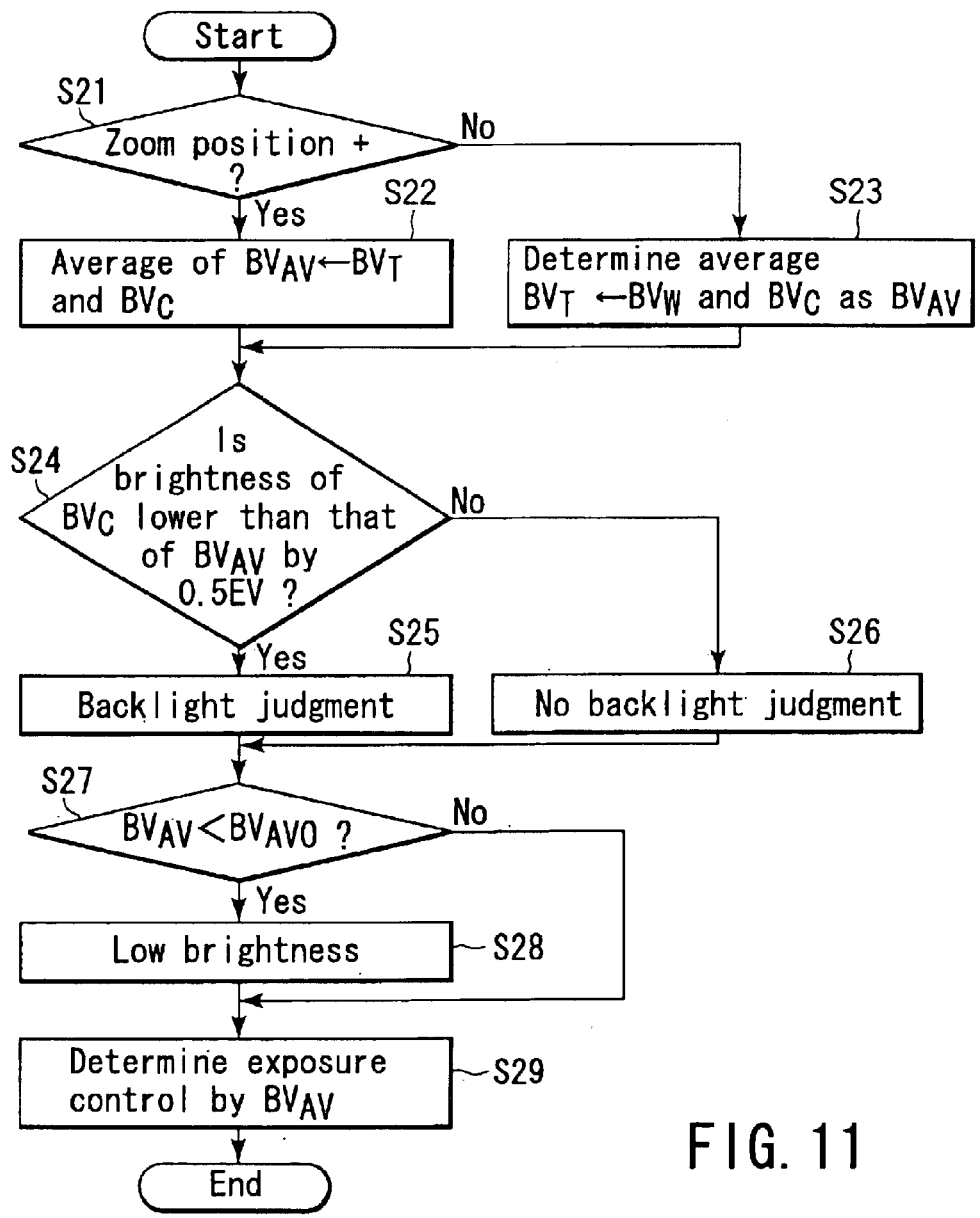
FIG. 11 is a flowchart illustrating a detail of an "exposure determination" operation at a step S16 in the flowchart of FIG. 9.

FIG. 11 is a flowchart illustrating a detail of an "exposure determination" operation at the step S16 in the flowchart of FIG. 9.

First, at a step S21, a zoom position of the taking lens of the camera is judged. Here, if the zoom position is on the tele side, the processing advances to a step S22, an average value of $BV_T$ and $BV_C$ is determined as an average photometric value $BV_{AV}$, and $BV_W$ at the peripheral part is not used.

On the other hand, if the zoom position is on the wide side at the step S21, the processing advances to a step S23, and the average value including $BV_W$ (see FIG. 5) is determined as the average photometric value $BV_{AV}$.

Subsequently, at a step S24, $BV_{AV}$ is compared with the brightness $BV_C$ of the AF sensor array portion. Here, if $BV_C$ is darker (not less than 0.5 EU), the processing proceeds to a step S25, and a backlight judgment is made. On the other hand, if $BV_C$ is brighter, the processing advances to a step S26, and the backlight judgment is not carried out.

At a step S27, $BV_{AV}$ is compared with a predetermined brightness $BV_{AV0}$ (which may be changed depending on a film sensitivity). If it is found that $BV_{AV}$ is darker as a result of the comparison, the low brightness is determined. In case of the low brightness, the processing advances to a step S28 where the setting of the low brightness is carried out.

Then, at a step S29, a shutter speed and an aperture of the lens are determined based on $BV_{AV}$ and the film sensitivity.

It is to be noted that $BV_C$ in FIG. 5 is utilized as the brightness of the main object in order to simplify the explanation in this example, but the AF sensor data of a part where the object exists may be used as the brightness of the main object.

As described above, according to this embodiment, since the AF sensor and the AE sensor are integrated in the compact manner and the output terminals are also used in common, the user-friendly camera sensor with less wirings can be inexpensively provided.

Figure 12:
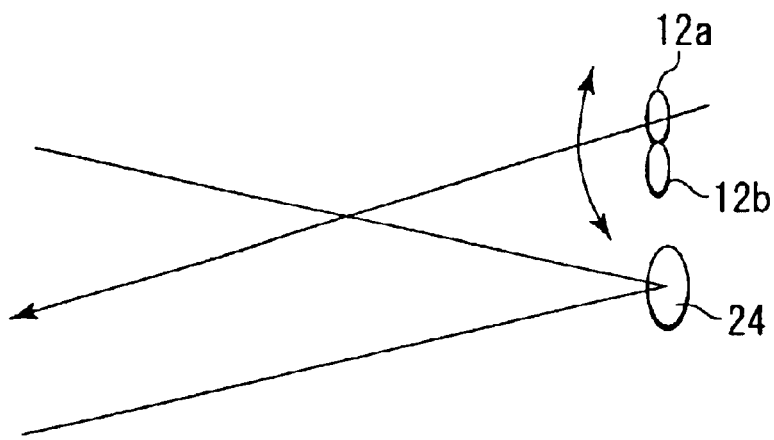
FIG. 12 is a view illustrating direction matching of a finder 24 and a light-receiving lens 12a of the sensor.

Although an appearance of the camera having this sensor mounted therein is shown in FIG. 2, since the finder 24 and the light-receiving lenses 12a and 12b of this sensor have different optical paths and a parallax, matching of direction of the finder 24 and the light-receiving lens 12a of this sensor much be performed as shown in FIG. 12. According to the present invention, however, since the AF and AE sensors are constituted on the same chip, the adjustment of matching of the directions can be completed at one try. This simplifies the adjustment since two times of adjustment are required for AF and AE if the sensors are separately provided.

Figure 13A:
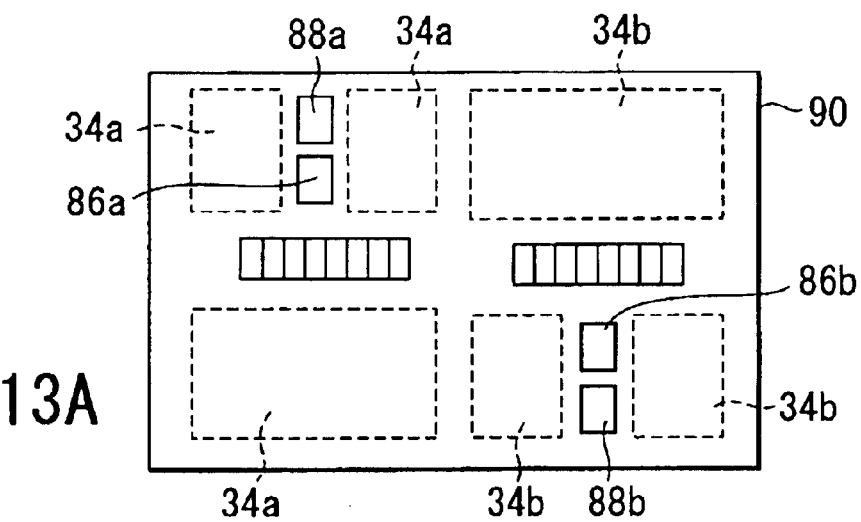
FIGS. 13A and 13B are views showing another example of the layout of the photometric sensor array and the processing circuit section on the semiconductor chip.
Figure 13B:
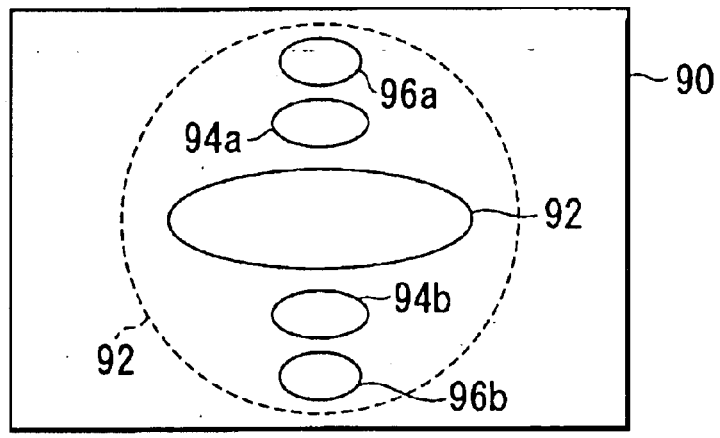

Moreover, as shown in FIGS. 13A and 13B, the processing circuit layout areas 34a and 34b may have margins by making the AE sensor light receiving plane smaller than that shown in FIG. 4C (AET sections 86a and 86b, AEW sections 88a and 88b). In this embodiment, the layout on the chip becomes simpler than that shown in FIGS. 4B and 4C, the chip can be miniaturized and the cost can be reduced.

At this time, the AF section and the AE section can perform the photometry of such a part as shown in FIG. 13B all together with respect to the picture plane 90, thereby enabling the center emphasized photometry. This likewise uses the AET sections 94a and 94b and the AEW sections 96a and 96b together with the AF section in the wide mode, and uses the AET sections 94a and 94b and the AF section 92 without utilizing the AEW sections 96a and 96b which correspond to the outside of the picture plane in the tele mode, thereby selecting the photometric area optimized according to a field angle (zooming).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A camera comprising:

a light-receiving lens;

a pair of distance measuring sensor arrays which receive an object light flux from a central area of footage through the light-receiving lens, and which are formed on a semiconductor chip;

a focus adjustment mechanism which adjusts a focusing state of a taking lens based on outputs from the distance measuring sensor arrays;

a pair of photometric sensors which are arranged on the semiconductor chip adjacent to the pair of the distance measuring sensor arrays to perform photometry of a peripheral area of the footage; and an exposure control section which performs an exposure control at the time of shooting by using brightness information of the central area of the footage output based on the image signal of the pair of distance measuring sensor arrays, and brightness information of the peripheral area of the footage detected by the pair of photometric sensors.

2. The camera according to claim 1, wherein one of the pair of the photometric sensors performs photometry of an upper part of the footage and the other one of the pair of photometric sensors performs photometry of a lower part of the footage.

3. The camera according to claim 1, wherein the exposure control portion comprises a judgment portion which judges a backlight state of an object based on the brightness information of the central area of the footage and the brightness information of the peripheral area of the footage.

4. A sensor unit for a camera, said sensor unit comprising:

a light-receiving lens;

first and second distance measuring sensor arrays which are formed on a single semiconductor chip, and which receive an object light flux from a central part of a footage through the light-receiving lens;

first and second photometric sensors which are formed on the single semiconductor chip and which receive an object light flux from a peripheral part of the footage through the light-receiving lens; and a control section which performs a focus adjustment of a taking lens based on outputs from the first and second distance measuring sensor arrays, and which carries out an exposure quantity control based on outputs from the first and second distance measuring sensor arrays and outputs from the first and second photometric sensors.

* * * * *